United States Patent
Hirashima

(10) Patent No.: US 6,377,527 B1
(45) Date of Patent: Apr. 23, 2002

(54) DISK DRIVE DEVICE HAVING A FUNCTION OF PREVENTING VIBRATION OWING TO MASS ECCENTRICITY OF DISK

(75) Inventor: Minoru Hirashima, Kadoma (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/471,450

(22) Filed: Dec. 23, 1999

(30) Foreign Application Priority Data

Jan. 7, 1999 (JP) .......................................... 11-002104

(51) Int. Cl.[7] .................................................. G11B 7/00
(52) U.S. Cl. ................................. 369/53.23; 369/44.28
(58) Field of Search ........................... 369/44.28, 44.29, 369/44.27, 53.23, 53.3, 53.37, 53.14, 47.41, 47.44, 47.4

(56) References Cited

U.S. PATENT DOCUMENTS

| | | | | |
|---|---|---|---|---|
| 4,835,752 A | * | 5/1989 | Nakatsu et al. | 360/78.04 |
| 5,844,866 A | * | 12/1998 | Fujimoto et al. | 369/53.14 |
| 6,064,633 A | * | 5/2000 | Kuwayama et al. | 369/215 |
| 6,256,275 B1 | * | 7/2001 | Eguchi et al. | 369/44.28 |

FOREIGN PATENT DOCUMENTS

| | | |
|---|---|---|
| JP | 60-147975 | 8/1985 |
| JP | 3-22228 | 1/1991 |
| JP | 10-124979 | 5/1998 |

* cited by examiner

*Primary Examiner*—Thang V. Tran
(74) *Attorney, Agent, or Firm*—Jordan and Hamburg LLP

(57) ABSTRACT

In a disk drive device, a CPU of a CD-R drive starts acceleration from low rotational driving towards a target rotational speed in a condition in which a tracking servo is in an OFF condition and simultaneously starts counting a number of tracking errors prior to performing recording or reproduction. Upon comparison of the number of counts and a specified threshold for determining vibration, in case the number of counts has exceeded the threshold, the tracking servo are turned ON for performing recording or reproduction at a rotational speed that is lower than the target rotational speed.

5 Claims, 2 Drawing Sheets

DISK DRIVE DEVICE HAVING A FUNCTION OF PREVENTING VIBRATION OWING TO MASS ECCENTRICITY OF DISK

FIELD OF THE INVENTION

The present invention relates to a disk drive device for performing recording and/or reproduction of information by irradiating optical beams onto a recording surface of a disk type recording medium such as a CD-R or CD-ROM.

It is generally known that such type of disk drive device can be operated at high rotational speed (for instance, double speed or fourfold speed) for improving a speed for reading out information that is recorded on a disk type recording medium (hereinafter referred to as "disk"). However, owing to the drawback that vibration or noise is generated at higher rotational speeds in case mass eccentricity resides in the disk, various measures have been proposed to cope therewith.

For example, there are known various methods and devices for detecting an amount of mass eccentricity of tracks of a disk so as to enable an optical head pickup) to correctly detect tracks during seeking actions or the like and to enable rapid retrieving access (see, for example, Japanese Patent Application Laid-Open Publication No. 3-22228 (1991) or Japanese Patent Application Laid-Open Publication No. 60-147975 (1985)).

In case the rotational speed of the disk is high at the time of performing reproducing actions, it may be that high frequency signals that have been read out by the optical head are affected through surface swings or eccentricity of the disk owing to vibration such that tracking error signals are disturbed whereby posing actions (jumping actions in units of a single track for making the optical head remain on the same track of the disk) may result in failure. In view of this fact, it has been suggested for a device wherein a rotational speed of a disk at the time of posing action is made smaller than a rotational speed at the time of reproduction to thereby reduce influences of surface swings or mass eccentricity of the disk owing to vibration cause during posing actions (see, for instance, Japanese Patent Application Laid-Open No. 10-124979 (1998)).

In the above mentioned devices for detecting an amount of mass eccentricity of tracks of a disk as recited in the former publications, there are required additional signals of specified speed for detecting directions in order to obtain an amount of mass eccentricity. Further, since the tracking servo is not turned OFF during detection, it is difficult to detect swings in a lens free condition of the optical pickup so that noise and vibration that is uncomfortable for a user cannot be restrained through actions performed at high rotational speed. Also, the technique as recited in the latter publication is related to coping with situations that are performed during posing actions only. While it is also known for a technique of performing detection of vibration by means of an acceleration sensor that is provided in such a device, it will result in a more complicated structure and in higher costs.

SUMMARY OF THE INVENTION

The present invention has been made for solving the above problems, and it is an object thereof to provide a disk drive device with which noise or vibration that is uncomfortable for a user can be easily decreased by the arrangement of detecting vibration owing to mass eccentricity of a disk and suitably reducing the rotational speed at the time of performing reproducing actions.

In the present invention, a counting means counts a number of tracking errors in a condition in which a tracking servo is in an OFF condition, and in case the number of tracking errors has exceeded a specified threshold for detecting vibration, a control means reproduces information while turning the tracking servo and remaining servos ON at a rotational speed that is lower than a target rotational speed. The number of counted tracking errors may thus be made to correspond to the vibration owing to mass eccentricity of the disk so that swings in the lens of the optical head may also be detected, and in case the vibration is large, the rotational speed is decreased for performing reproducing actions. With this arrangement, generation of noise or vibration can be restrained.

The control means performs recording or reproduction of information by turning the tracking servo and remaining servos ON at a rotational speed that has been decreased in a step-wise manner in case the number of counts has exceeded the threshold to be a rotational speed that is in a range in which the number of counts does not exceed the threshold. With this arrangement, reproducing actions at a highest possible rotational speed can be performed while restraining generation of noise or vibration.

The control means performs automatic adjustments by performing low rotational driving while the tracking servo and remaining servos are in an ON condition before the counting means starts counting actions by turning the tracking servo OFF and immediately after the disk type recording medium has been loaded into the drive device. In such an automatic adjustment, adjustments of balances of tracking or focus errors may be performed so that detection of vibration can be thereafter performed in a suitably adjusted manner.

PREFERRED EMBODIMENTS OF THE INVENTION

Figure 1:
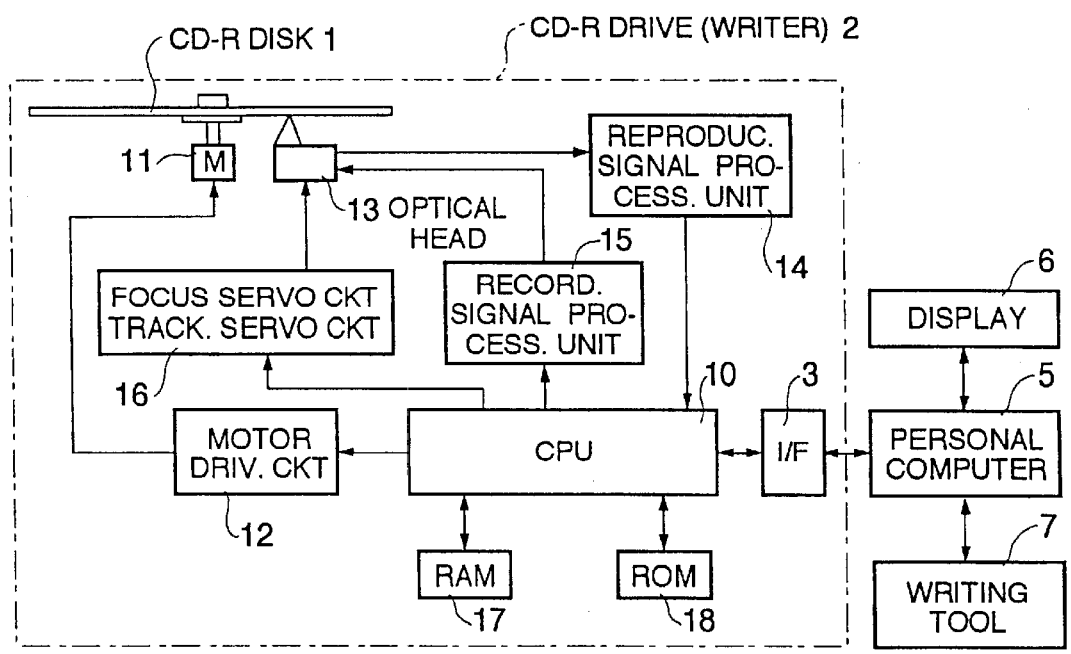
FIG. 1 is a schematic diagram of a disk drive device according to an embodiment of the present invention.

The disk drive device according to one embodiment of the present invention will now be explained with reference to the drawings wherein the disk drive device is used for a CD-R disk (CD-recordable disk, also referred to as "write once CD") which is a direct read after write optical disk. In FIG. 1, the disk drive device comprises a CD-R drive (writer) 2 for performing reading out (reproduction) or writing in (recording) of data of a CD-R disk 1. A host computer or personal computer 5 (hereinafter referred to as "personal computer") for performing overall control of the entire system via an interface 3 and for performing specified calculating processes is connected to the CD-R drive 2. To the personal computer 5, there are connected a display 6 of liquid crystal type or similar, and a writing tool 7 comprised of a hard disk and other members storing therein programs related to recording actions. The hard disk further stores therein data that the user intends to write into the CD-R disk 1.

The CD-R drive 2 is provided with a CPU 10 for performing transfer of data as well as recording and reproduction of data of the CD-R upon instructions from the personal computer 5. The CD-R drive 2 further includes a motor 11 for rotationally driving a table for the CD-R disk 1, a driving circuit 12 thereof, an optical head (pickup) 13, a processing unit 14 for processing reproduction signals from the optical head 13, and a focus servo circuit and tracking servo circuit 16 for controlling the optical head 13. To the CPU 10, there are connected a RAM 17 for recording device information required for performing writing in of data into the CD-R disk 1 and ROM 18 for storing therein programs.

The CD-R drive 2 is controlled based on instructions that are input into the personal computer 5 from an operational unit that is not shown in the drawings and based on a corresponding programs and performs either recording of data that are transferred from the personal computer 5 into the CD-R disk 1 at a specified speed or reproduction of data that are recorded on the CD-R disk 1 at a specified speed. The CPU 10 has a function of performing, prior to the recording or reproduction, detection of vibration owing to mass eccentricity of the disk from among recording or reproduction speeds that are applicable to the disk by using tracking error signals (signals that are generated in case tracks are crossed), and in case the degree of vibration is large, of reducing the rotational speed (multiple-speed).

More particularly, acceleration is started from low rotational driving towards a target rotational speed with the tracking servo being in an OFF condition and counting of numbers of tracking errors is simultaneously started (counting means), and in case the number of counts has exceeded a specified threshold for determination of vibration, recording and reproduction of data is performed at a rotational speed that is lower than the target rotational speed, and in case the rotational speed has reached the target rotational speed without the number of counts exceeding the threshold, recording and reproduction of data is performed at the target rotational speed (control means). It should be noted that applicable recording and reproduction speeds (standard speed, double speed, fourfold speed, eightfold speed, twenty-fourfold speed or the like) or optimal laser power for the disk are encoded in the CD-R disk 1 as ATIP information.

Figure 2:
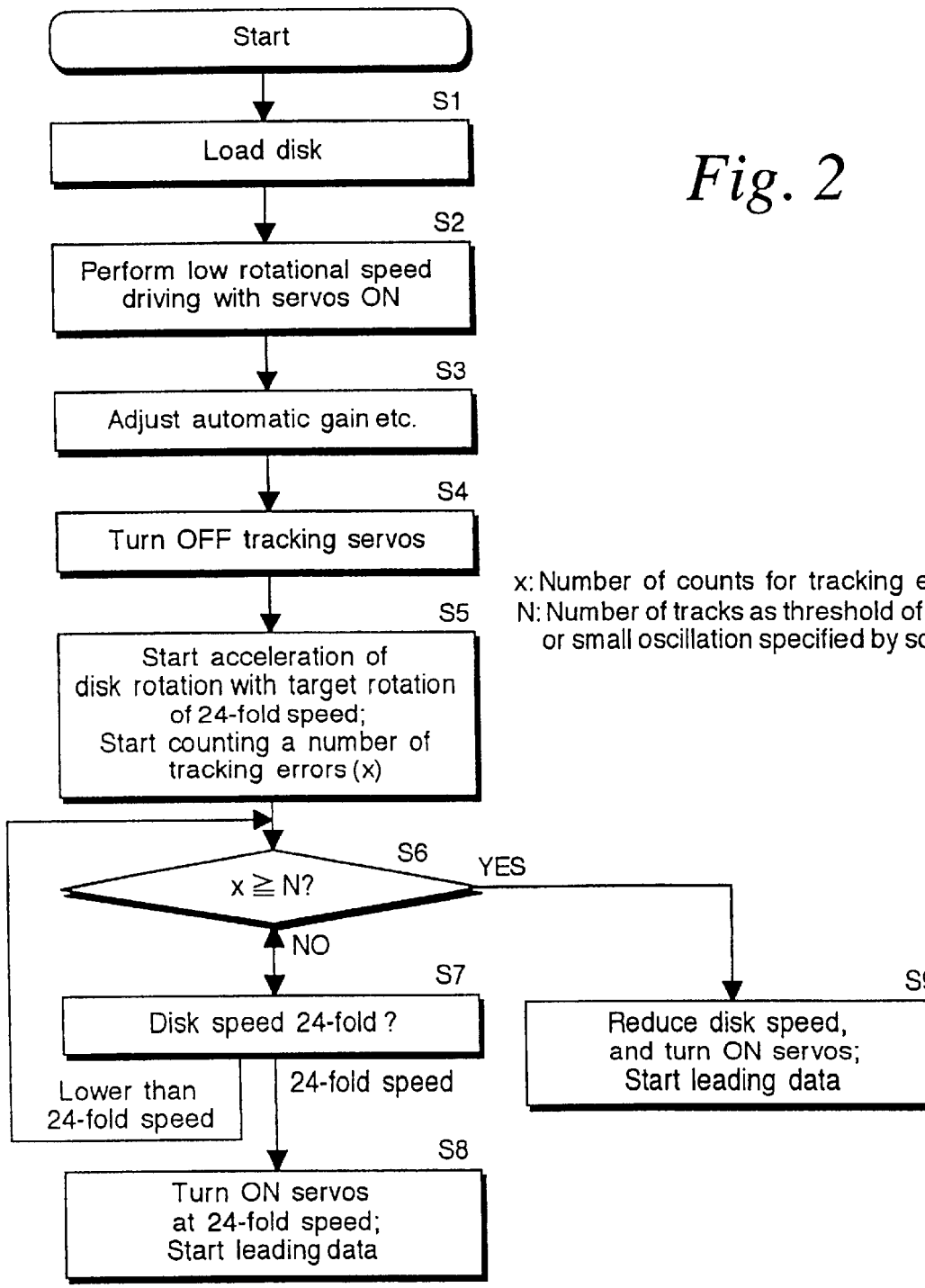
FIG. 2 is a flowchart of processes of reproduction actions of the disk drive device.

FIG. 2 is a flowchart showing processes of reproduction actions of a twenty-fourfold speed CD-R disk 1. After loading the CD-R disk 1 into the CD-R drive 2 (writer) (S1), low rotational speed driving is performed with the tracking servo and remaining servos being in an ON condition (S2). Error signals that can be obtained thereby are picked up and automatic gain adjustment of tracking or focus errors is performed (S3). Through this process, detection of vibration can be hereinafter performed with suitable adjustments being made. Then, the tracking servo is turned OFF (S4), and acceleration of rotation of the disk is started with the target rotation being a twenty-fourfold speed while simultaneously starting counting a number of tracking errors x for detection of vibration (S5). Comparison is then made of the number of counts x for the tracking errors and a number of tracks N which is the specified threshold for determining vibration (S6), and in case the number of counts x has exceeded the number of tracks N which is the threshold (YES at S6), it is determined that the degree of vibration is large and the speed of the disk is set to be a rotational speed that is lower than the target rotational speed (e.g. fourfold speed), and the tracking servo and remaining servos are turned ON for performing reproduction actions to lead data (S9). In case the number of counts x is in a range in which it does not exceed the number of tracks N of the threshold, the disk speed is checked (S7) and when the rotational speed has reached twenty-fourfold speed which is the target rotational speed, the tracking servo and remaining servos are turned ON at the twenty-fourfold speed to start reproduction actions to lead data (S8).

By making the device perform these actions, the rotational speed can be decreased in case the vibration of the disk is large whereby noise and vibration can be decreased. The reason for detecting vibration performed at S4 with the tracking servo in an OFF condition is as follows: high speed rotation of a disk with mass eccentricity results in vibration whereby the optical head 13 is similarly vibrated. At this time, when the tracking servo is in an OFF condition, the lens is in a free condition such that it is swung with the vibration wherein this swing is represented as a tracking error signal. Thus, by counting the number of tracking error signals, it can be detected whether the degree of vibration is large or small.

It should be noted that the present invention is not limited to the arrangement of the above-described embodiment and may be varied in many ways. For example, in the action of setting the disk speed to a rotational speed that is smaller than the target rotational speed when performing processes for detecting vibration at S9, the speed may be reduced in a step-wise manner so as to enable reproduction actions at a highest speed possible.

As described above, since the present invention is arranged in that reproduction actions are performed at a rotational speed that is lower than a target rotational speed in case a number of tracking errors that has been counted with the tracking servo in an OFF condition has exceeded a threshold for detecting vibration, it is made possible to decrease noise or vibration owing to mass eccentricity of the disk with a simple arrangement.

What is claimed is:

1. A disk drive device for performing recording and/or reproduction of information by irradiating optical beams on a recording surface of information tracks for recording on a disk type recording medium, wherein the disk drive device comprises:

a counting means for counting a number of tracking errors, prior to the recording or reproduction upon loading the disk type recording medium into the drive device, when acceleration from low rotational driving up to a target rotational speed is started in a condition in which a tracking servo is in an OFF condition; and, a control means for performing recording or reproduction of information by turning the tracking servo ON at a rotational speed that is lower than the target rotational speed in case the number of counts has exceeded the threshold by comparing the number of counts as counted by the counting means with a specified threshold for determining vibration, and for performing recording or reproduction of information by turning the tracking servo ON at the target rotational speed in case the rotational speed has reached the target rotational speed without the number of counts exceeding the threshold.

2. The disk drive device according to claim 1, wherein the control means performs recording or reproduction of information by turning the tracking servo ON at a rotational speed that has been decreased in a step-wise manner in case the number of counts has exceeded the threshold to be a rotational speed that is in a range in which the number of counts does not exceed the threshold.

3. The disk drive device according to claim 1, wherein the control means further performs automatic gain adjustments by performing low rotational driving while the tracking servo are in an ON condition prior to the counting means starts counting actions by turning the tracking servo OFF, immediately after the disk type recording medium has been loaded into the drive device.

4. The disk drive device according to claim 1, wherein the drive device is connected to a computer;

wherein the disk type recording medium is a CD-R disk; and, wherein the control means performs recording of data that are transferred from the computer on the CD-R disk at a speed that is applicable to the disk.

5. The disk drive device according to claim 1, wherein the drive device is connected to a computer;

wherein the disk type recording medium is a CD-R disk; and, wherein the control means performs reproducing of data that are recorded on the CD-R disk based on instructions from the computer at a speed that is applicable to the disk.

* * * * *